United States Patent [19]

Milburn

[11] 3,801,452

[45] Apr. 2, 1974

[54] NUCLEAR REACTOR FUEL ELEMENTS

[75] Inventor: George Milburn, St. Annes, England

[73] Assignee: United Kingdom Atomic Energy Authority, London, England

[22] Filed: Aug. 21, 1970

[21] Appl. No.: 65,964

[30] Foreign Application Priority Data
Sept. 3, 1969 Great Britain .................... 43715/69

[52] U.S. Cl. .................................... 176/78, 176/76
[51] Int. Cl. ............................................. G21c 3/34
[58] Field of Search ................................. 176/76, 78

[56] References Cited
UNITED STATES PATENTS
3,510,397  5/1970  Zettervall ............................. 176/78
3,442,763  5/1969  Chetter et al. ........................ 176/78
3,380,890  4/1968  Glandin et al. ....................... 176/78
3,182,003  5/1965  Thorp et al. .......................... 176/78

Primary Examiner—Carl D. Quarforth
Assistant Examiner—E. E. Lehmann
Attorney, Agent, or Firm—Larson, Taylor & Hinds

[57] ABSTRACT

A fuel pin spacer grid has apertures through which the fuel pins extend. Each fuel pin bears against two pairs of longitudinally spaced stop members being biassed against the stop members by spring means acting on the fuel pin intermediate the pairs of stop members. The stop members are semi-resilient so as to allow small lateral deflections of the fuel pins but so as to become rigid to prevent greater lateral deflections of the fuel pins.

4 Claims, 4 Drawing Figures

NUCLEAR REACTOR FUEL ELEMENTS

BACKGROUND OF THE INVENTION

This invention relates to nuclear reactor fuel assemblies and in particular to that kind of fuel assembly including a plurality of elongate fuel pins supported in a bundle with their longitudinal axes parallel. Such a fuel element assembly employs one or more spacer grids disposed intermediate the ends of the assembly and serving to restrict fuel pin movement within the spacer grid and to retain the correct location of the fuel pins in the assembly relative to one another.

In an early form of spacer grid the fuel pins were supported by opposed resilient members. This arrangement, however, constitutes an unstable "mass spring" arrangement in which fuel pin movement continues until the resulting spring deflection produces a force large enough to counteract the disturbance. No matter how stiff the resilient members microscopic movement of an oscillating nature will occur producing fretting of the fuel pins, that is wear of the fuel pins at the points of contact with the resilient members.

In another form of spacer grid the fuel pins are held against rigid support means by resilient members positioned in opposed relationship to the rigid support means. In this arrangement the spring force of the resilient members is chosen to ensure that the fuel pins do not break contact with the rigid support means and in particular to ensure that the fuel pins do not tap on the rigid support means as this results in severe fretting. Although vibration of the fuel pins within a spacer grid is minimised by this arrangement lateral oscillations of fuel pins between adjacent spacer grids in the assembly can still occur. Such oscillations will produce rubbing between the pin and the support means with a consequent fretting.

According to the present invention a spacer grid structure for a nuclear reactor fuel element assembly including a plurality of elongate fuel pins supported in a bundle with their longitudinal axes parallel is of cellular form, having openings through which the fuel pins extend, said grid structure having at least two support members extending into each of said openings for supporting fuel pins laterally in the openings, the support members being longitudinally spaced with respect to the axis of the fuel pins and resilient means being provided extending into each of said openings in opposed relationship with said support members and located to engage with and bias the fuel pins into engagement with the support members, the support members being of a form so as to be resilient to small lateral deflections of the fuel pins arising from small forces acting on the fuel pins and so as to become substantially rigid to prevent further deflection of the fuel pins under forces greater than a minimum defined by the resilience of the support members.

In a particular arrangement the resilient means are disposed to engage the fuel pins at a location between the longitudinally spaced support members.

DESCRIPTION OF THE DRAWINGS

Embodiments of the invention will now be described by way of example with reference to the accompanying drawings in which.

DESCRIPTION OF THE PREFERRED EMBODIMENTS

Figure 1:
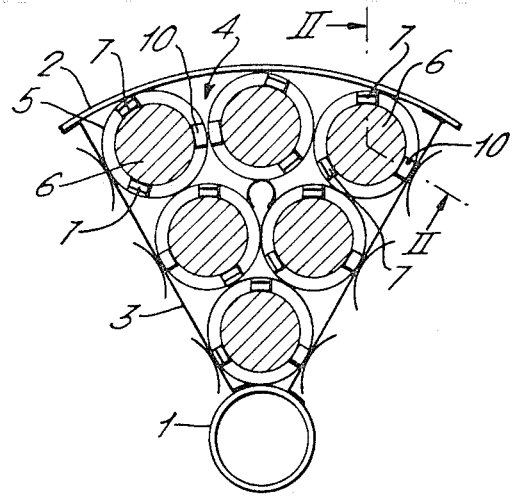
FIG. 1 is a plan view of part of a spacer grid in accordance with the invention.
Figure 2:
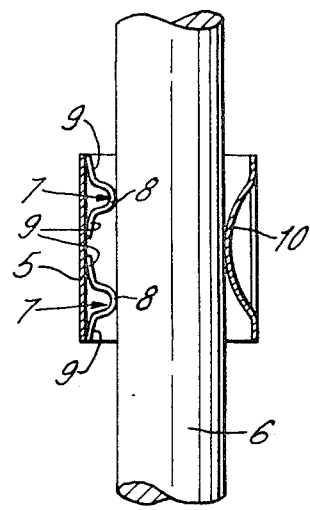
FIG. 2 is a detail in section along the line II—II in FIG. 1.

The spacer grid shown in FIGS. 1 and 2 of the drawings comprises a central tubular ferrule 1 and an outer circular band 2. The ferrule 1 and the outer band 2 are joined by radial webs 3 which divide the area of the grid into sectors 4, typically eight in number. Each sector 4 contains six tubular ferrules 5 which are joined together at their points of contact with each other and with the central ferrule 1, the outer band 2 and the radial webs 3 by spot welding. The spacer grid provides lateral location for an assembly of elongate fuel pins 6 supported in a bundle with their longitudinal axes parallel, each of the ferrules 5 being penetrated by a fuel pin 6.

As shown in FIG. 2 two pairs of support members 7 are provided in each of the ferrules 5. The support members 7 are formed from springy strip material and have a U-shaped rigid stop portion 8 and splayed resilient leg portions 9. The support members 7 in each pair are spaced longitudinally in the ferrules 5 with respect to the longitudinal axis of the fuel pins 6. The two pairs of support members 7 are spaced apart circumferentially by 120°. A bow spring member 10 is formed in each ferrule 5 arranged generally opposite to the support members 7. The bow spring members 10 engage with the fuel pins so that the fuel pins 6 are biassed into engagement with the support members 7. The support members 7 are resilient to small deflections of the fuel pins 6 arising from small forces acting on the fuel pins 6. Resilience of the support members 7 arises from bending of the leg portions 9. Deflection of the fuel pins 6 under larger forces is prevented by the stop members 7 becoming substantially rigid by bending of the leg portions 9 until they become flat against the inner walls of the ferrules 5, when further deflection of the fuel pins 6 is prevented by the stop portions 8 of the member 7. The force under which the stop members 7 becomes rigid is defined by the degree of resilience of the leg portions 9 of the stop members 7.

Figure 3:
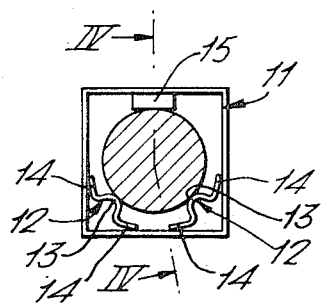
FIG. 3 is a plan view of a component part of a second form of grid in accordance with the invention.
Figure 4:
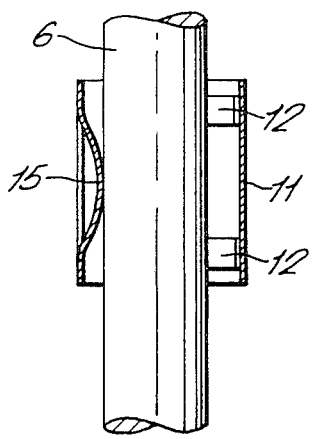
FIG. 4 is a detail in section along the line IV—IV in FIG. 3.

The arrangement shown in FIGS. 3 and 4 of the drawings comprises a rectangular ferrule 11. A number of the ferrules 11 are assembled together to form a rectangular grid structure each of the ferrules 11 being penetrated by a fuel pin 6 in a cluster of the fuel pins 6. Two pairs of support members 12 are provided in the ferrule 11. Similarly to the support members 7 in the arrangement of FIGS. 1 and 2 the support members 12 are formed from springy strip material and have a U-shaped stop portion 13 and splayed leg portions 14. Each pair of support members 12 is fitted in a corner of the ferrule 11. The support members 12 in each pair are spaced longitudinally in the ferrule 11 with respect to the longitudinal axis of the fuel pin 6. A bow spring member 15 is formed in the side of the ferrule 11 opposite to the support members 12. The bow spring member 15 engages with the fuel pin 6 and biasses the fuel pin 6 into engagement with the support members 12. As in the arrangement of FIGS. 1 and 2 the support members are resilient to small deflections of the fuel pin 6 arising from small forces acting on the fuel pin 6 but become substantially rigid to prevent deflection of the fuel pin 6 under larger forces.

I claim:

1. In a nuclear reactor fuel element assembly including a plurality of elongate fuel pins supported in a bundle with their longitudinal axes parallel, a spacer grid structure, the grid structure being of cellular form, having openings through which the fuel pins extend, said grid structure having at least two support members extending into each of said openings for supporting fuel pins laterally in the openings, the support members being longitudinally spaced with respect to the axis of the fuel pins and resilient means being provided extending into each of said openings in opposed relationship with said support members and located to engage with and bias the fuel pins into engagement with the support members, the support members comprising means for responding resiliently to small lateral deflections of the fuel pins arising from small forces acting on the fuel pins and becoming substantially rigid to prevent further deflection of the fuel pins under forces greater than a minimum defined by the resilience of the support members.

2. A spacer grid structure as claimed in claim 1 wherein the resilient means are disposed to engage the fuel pins at a location between the longitudinally spaced support members.

3. A spacer grid structure as claimed in claim 1 wherein the support members have rigid stop portions which continuously engage the fuel pins, and resilient legs by means of which the support members are mounted in the openings of the grid structure, small lateral deflections of the fuel pins being accommodated by deflection of the resilient legs of the support members, lateral deflection of the fuel pins being limited by deflection of the resilient legs of the support members to the point where the rigid stop portions of the support members become effective in preventing further lateral deflection of the fuel pins in the openings of the grid structure.

4. A spacer grid structure as claimed in claim 3 comprising a cojoined layer of tubular ferrules, a first pair of laterally spaced support members at one level in each ferrule, a second similarly disposed pair of laterally spaced support members at another level in the ferrule, said resilient means comprising spring means disposed in opposed relationship to the support members in the ferrules to engage with and bias fuel pins extending through the ferrules into contact with the rigid stop portions of the support members, said spring means comprising a bow spring extending longitudinally in each ferrule and bearing on the fuel pins at a point intermediate the levels of the first and second pairs of support members.

* * * * *